(12) United States Patent
Lin

(10) Patent No.: US 7,391,626 B1
(45) Date of Patent: Jun. 24, 2008

(54) CHOP WAVE CONTROL CIRCUIT

(75) Inventor: Kuo-Fan Lin, Taoyuan Hsien (TW)

(73) Assignee: FSP Technology Inc., Taoyuan (TW)

( * ) Notice: Subject to any disclaimer, the term of this patent is extended or adjusted under 35 U.S.C. 154(b) by 0 days.

(21) Appl. No.: 11/808,411

(22) Filed: Jun. 8, 2007

(51) Int. Cl.
*H02M 3/22* (2006.01)

(52) U.S. Cl. ...................... 363/15; 363/21.04

(58) Field of Classification Search ............ 363/15, 363/16, 18, 20, 21.01, 21.04, 123, 125, 131
See application file for complete search history.

(56) References Cited

U.S. PATENT DOCUMENTS

| | | | | |
|---|---|---|---|---|
| 5,570,276 | A | * | 10/1996 | Cuk et al. ............... 363/16 |
| 5,991,168 | A | * | 11/1999 | Farrington et al. ......... 363/16 |
| 6,025,999 | A | * | 2/2000 | Farrington et al. ......... 363/16 |
| 6,130,828 | A | | 10/2000 | Rozman |
| 6,324,077 | B1 | * | 11/2001 | Lopresti et al. ........... 363/16 |
| 6,343,023 | B1 | * | 1/2002 | Wunderlich ............. 363/16 |
| 6,349,046 | B2 | * | 2/2002 | Yasumura ............... 363/21.02 |

FOREIGN PATENT DOCUMENTS

TW        186120        6/1992

* cited by examiner

*Primary Examiner*—Adolf Berhane
(74) *Attorney, Agent, or Firm*—Muncy, Geissler, Olds & Lowe, PLLC

(57) ABSTRACT

A chop-wave control circuit includes a feedback unit, a ramp generation unit, a latchup unit and a voltage transformation unit that is used on a forward transformation circuit which includes at least a main output unit and at least one auxiliary output unit. The feedback unit captures a feedback signal from an output end of the auxiliary output unit to generate a slope regulation signal. The ramp generation unit alters the trigger time sequence of the latchup unit through the slope regulation signal to set an auxiliary flywheel switch ON or OFF. The voltage transformation unit detects potential variations of the latchup unit to set a chop-wave switch ON or OFF. By controlling the auxiliary flywheel switch and the chop-wave switch a power output cycle of the auxiliary output unit can be formed.

9 Claims, 4 Drawing Sheets

CHOP WAVE CONTROL CIRCUIT

FIELD OF THE INVENTION

The present invention relates to a chop-wave control circuit to control at least one chop-wave switch to alter auxiliary output amount.

BACKGROUND OF THE INVENTION

To meet the requirements of various elements of different voltages in computers these days power supplies generally provide outputs at different voltage levels. For instance a power supply has more than one set of output end for 12V, 5V and 3.3V. Hence the primary power system of the power supply has to branch out necessary auxiliary output circuits from the main circuit. Generation of the auxiliary output circuits mostly relies on a chop-wave circuit. The chop-wave circuit can be seen as a switch circuit with a truncated waveform. It is widely used on a forward transformation circuit that includes a power driving unit, a transformer, a main output unit and at least one auxiliary output unit. The power driving unit delivers electric power through the transformer to the main output unit and auxiliary output unit. The main output unit generates a first sync signal and a second sync signals through a self-excited driving unit to control respectively a main output switch and a main flywheel switch that are ON alternately to deliver output. The chop-wave circuit is used for the secondary side of the transformer to control the level of auxiliary output voltage through ON/OFF of the switches. Reference of the chop-wave circuit is available in R.O.C. patent publication number 186120 entitled "Forward power supply having sync modulation" in which a chop-wave circuit to generate auxiliary output is shown in FIG. 1. In FIG. 1 OUT2 is the output end of the auxiliary output circuit. The chop-wave circuit to control the auxiliary output circuit is controlled by a comparator A. The comparator A has one end capturing the voltage of the secondary side of the transformer 2 (T2) and another end capturing a feedback voltage from an output end of the auxiliary output circuit to the other end. These two are compared by the comparator A, then an output is generated to control ON/OFF of a switch element to alter the electric power output by the auxiliary output circuit. As the comparator has a significant inherent transfer delay, transient action is slow and the response is not desirable. Moreover, the comparator does not have latchup function. Hence in the event that noise interference occurred to one or two input signals at the two ends of the comparator after weighed and balanced erroneous actions are prone to take place and result in control cycle fluctuation. Hence it is relatively not stable. Another reference is depicted in U.S. Pat. No. 6,130,828 entitled "Multiple output converter having self-synchronized pulse width modulation regulation". It also generates an auxiliary output through a chop-wave circuit. It has an integrator circuit (86) connecting to driver circuit (94). The integrator circuit (86) performs integration of a feedback signal through a capacitor (90) and a resistor (88). The driver circuit (94) has a stop point of ⅓ Vcc and a start point of ⅔ Vcc. The Vcc is the bias voltage power of the driver circuit (94). However, when the capacitor performs integration at ⅔ Vcc a significant transfer delay also occurs. The driver circuit (94) also does not provide latchup function. Moreover, in order to match the driving structure a P type chop-wave switch with a higher impedance and a poorer characteristic has to be used. This causes an additional loss. There are still rooms for improvement to address the undesirable transient response and control cycle fluctuation of the conventional chop circuits.

SUMMARY OF THE INVENTION

In view of the problems occurred to the conventional chop circuits such as significant transfer delay, undesirable transient response, no latchup function and frequent cycle fluctuation, the present invention aims to provide a chop-wave control circuit to solve the aforesaid problems.

The chop-wave control circuit according to the invention is adopted to be used on a forward transformation circuit which includes a power driving unit, a transformer, a main output unit and at least one auxiliary output unit. The auxiliary output unit includes an auxiliary output switch and an auxiliary flywheel switch and a chop-wave switch that are controlled by the chop-wave control circuit. The chop-wave control circuit includes a feedback circuit, a ramp generation unit, a latchup unit and a voltage transformation unit. The feedback unit captures a feedback signal from an output end of the auxiliary output unit and generates a slope regulation signal based on the feedback signal. The slope generation unit alters the slope of a triangular wave of an output trigger signal through the slope regulation signal. The latchup unit receives the trigger signal and alters the latchup condition according to the trigger signal to set the auxiliary flywheel switch ON or OFF. The voltage transformation unit detects the potential variation of the latchup unit, and outputs or stops a chopping signal according to alteration of the latchup condition of the latchup unit to set the chop switch ON or OFF. Through the slope regulation signal of the feedback unit the slope of the triangular wave of the trigger signal can be altered, thereby the trigger time of latchup unit can be changed. And the conduction timing of the auxiliary flywheel switch and chop-wave switch can be altered to match the action of the auxiliary output switch to form the power output cycle of the auxiliary output unit. The invention employs the latchup unit to achieve the functions of comparing feedback amount and ON/OFF driving of the auxiliary flywheel switch. Moreover, the latchup unit achieves the trigger function through a transistor. Thus the delay occurred to the comparator used in the conventional techniques can be greatly shortened. And the active duty cycle of auxiliary output increases and the transient response improves.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
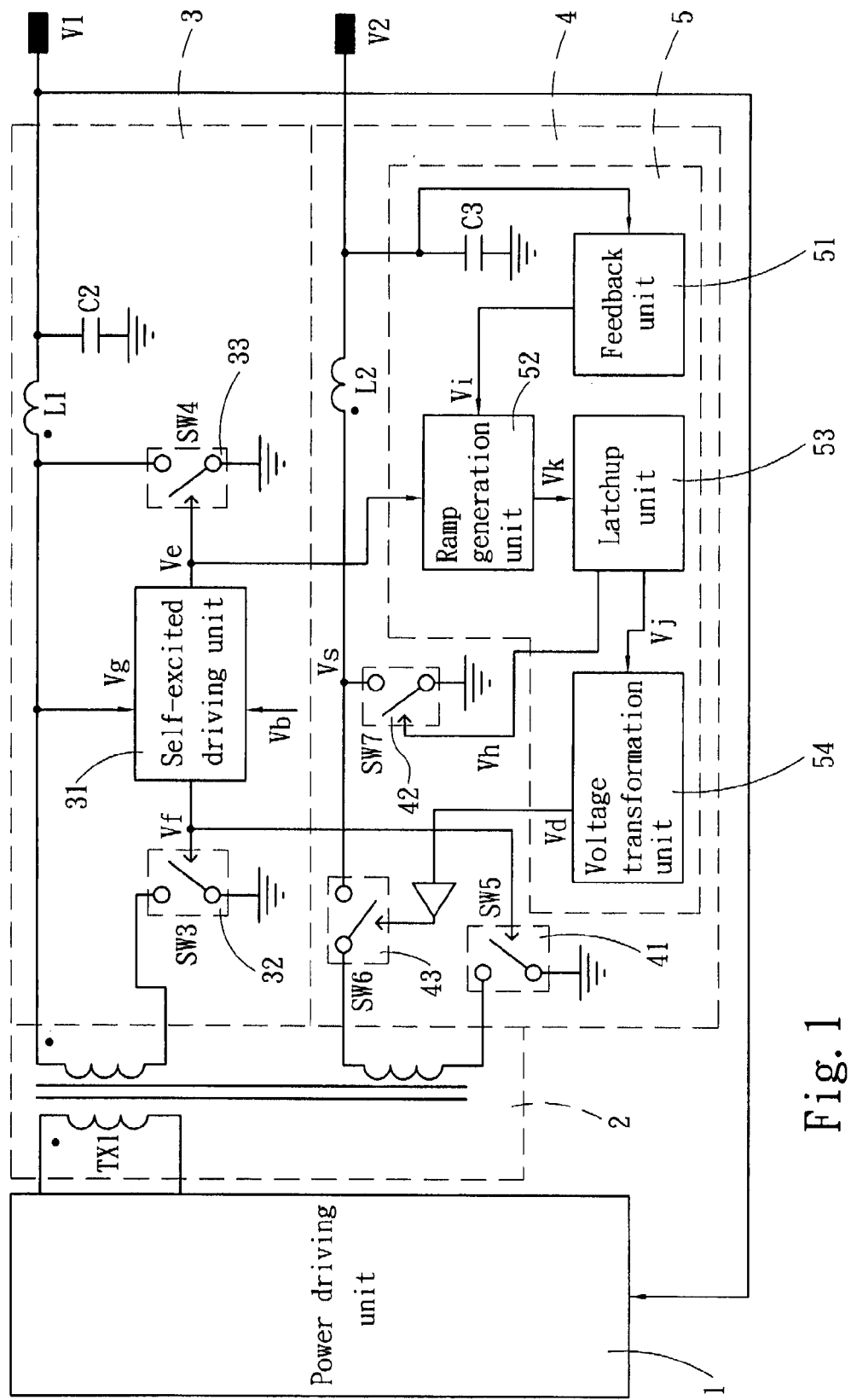
FIG. 1 is a block diagram of an embodiment of the invention.

Please refer to FIG. 1 for the block diagram of an embodiment of the invention. The invention provides a chop-wave control circuit 5 to be used on a forward transformation circuit which includes a power driving unit 1, a transformer 2, a main output unit 3 and at least one auxiliary output unit 4. The power driving unit 1 receives AC power which goes through processes such as rectification, filtering and power factor correction and is sent to the transformer 2. The main output unit 3 includes a self-excited driving unit 31, a main output switch 32 and a main flywheel switch 33. The self-excited driving unit 31 outputs a first sync signal Vf and a second sync signal Ve that control respectively alternate ON/OFF of the main output switch 32 and the main flywheel switch 33 to generate power output cycle of the main output unit 3. The auxiliary output unit 4 includes an auxiliary output switch 41 and an auxiliary flywheel switch 42 and a chop-wave switch 43 that are controlled by the chop-wave control circuit 5. The auxiliary output switch 41 is controlled by the first sync signal Vf and set ON/OFF synchronously with the main output switch 32. The chop control circuit 5 includes a feedback circuit 51, a slope generation unit 52, a latchup unit 53 and a voltage transformation unit 54. The feedback unit 51 captures a feedback signal from an output end of the auxiliary output unit 4 and generates a slope regulation signal Vi based on the feedback signal. The slope generation unit 52 outputs a trigger signal Vk which includes a triangular wave, and alters the slope of the triangular wave through the slope regulation signal Vi. The latchup unit 53 receives the trigger signal Vk to and alters the latchup condition according to the trigger signal Vk to set ON or OFF of the auxiliary flywheel switch 42 connecting to the latchup unit 53. The voltage transformation unit 54 detects potential variations of the latchup unit 53, and outputs or stops a chop-wave signal Vd according to alteration of the latchup condition of the latchup unit 53 to set the chop-wave switch 43ON or OFF. Through the slope regulation signal Vi output by the feedback unit 51 according to variations of output feedback, the slope of the triangular wave of the trigger signal Vk can be altered, thereby the trigger time of latchup unit 53 can be changed. And the conduction timing of the auxiliary flywheel switch 42 and chop-wave switch 43 can be altered to match the action of the auxiliary output switch 41 to form the power output cycle of the auxiliary output unit 4.

Figure 2:
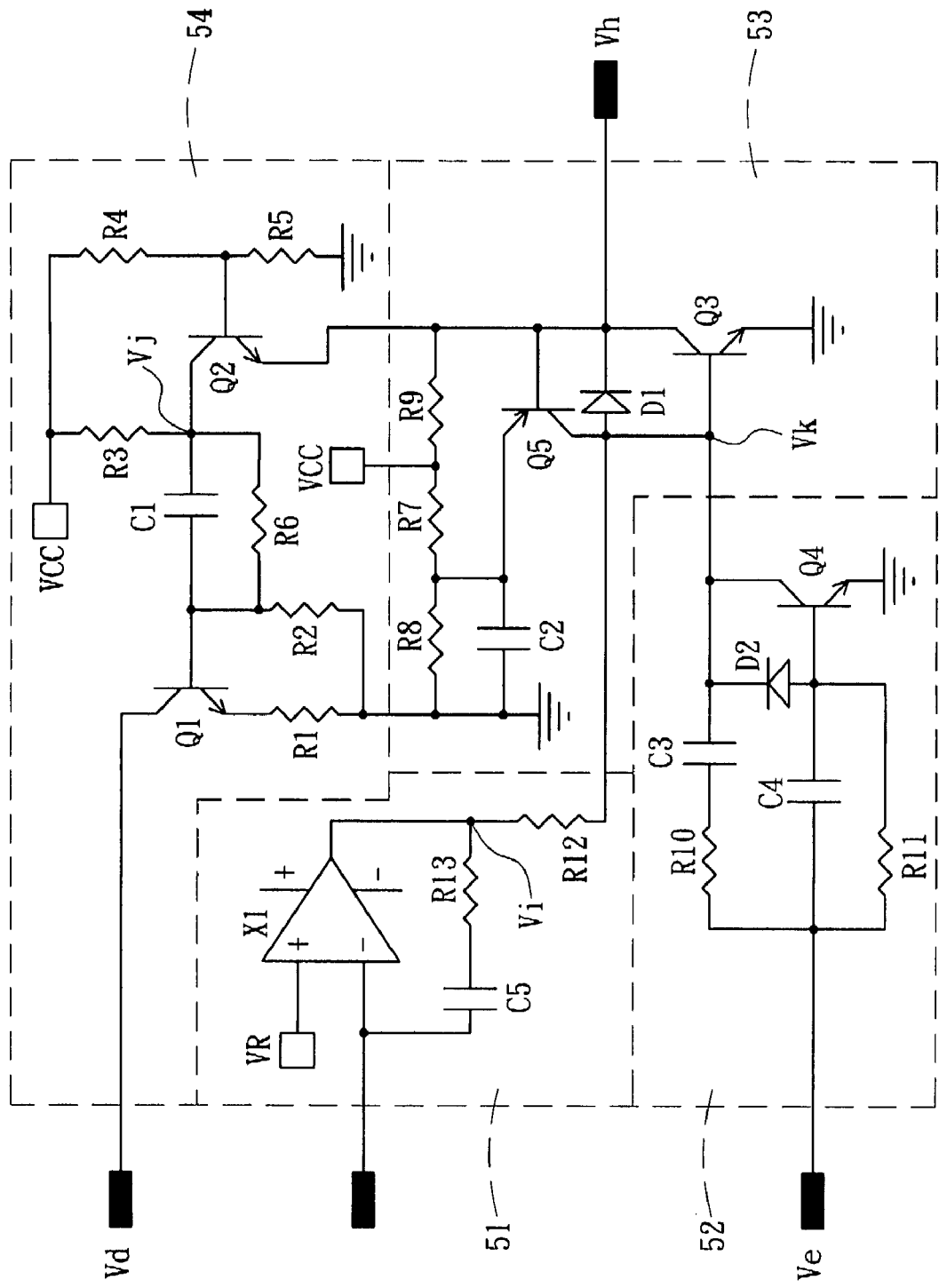
FIG. 2 is a circuit diagram of an embodiment of the invention.

Refer to FIG. 2 for the circuit diagram of an embodiment of the invention. The feedback unit 51 includes a comparator X1 and a reference voltage Vr. The feedback signal and the reference voltage Vr are input to the comparator X1. The comparator X1 outputs the slope regulation signal Vi based on the difference of the feedback signal and the reference voltage Vr, and this is the characteristics of the comparator X1. The output is greater when the difference of the two input signals of the comparator X1 is greater. The output of the comparator X1 is connected to one end of the slope generation unit 52 which consists of a transistor Q4, two capacitors C3 and C4, two resistors RIO and R11, and a diode D2. The two capacitors C3 and C4, two resistors RIO and R11 and diode D2 form a charge circuit. The transistor Q4 can be set ON/OFF by the second sync signal Ve to control charging and discharging of the capacitor C3. When the second sync signal Ve is at a high potential the transistor Q4 is ON and the second sync signal Ve charges the capacitor C3. When the second sync signal Ve is at a low potential the transistor Q4 is OFF and the capacitor C3 starts discharging. The latchup unit 53 includes a bias power source, three resistors R7, R8 and R9, a capacitor C2, a diode D1 and two transistors Q3 and Q5. The transistors Q3 and Q5 and the diodes D1 form a latchup circuit. The latchup circuit can be in an ON condition in which the transistors Q3 and Q5 are ON, or in an OFF condition in which the transistors Q3 and Q5 are OFF. When the latchup circuit is in the OFF condition, the bias power source Vcc charges the capacitor C2 through voltage division of the resistors R7, R8 and R9 to form a charge circuit. The bias power source Vcc also outputs a flywheel switch driving signal Vh through voltage division of the resistors R7 and R9 to set the auxiliary flywheel switch 42 ON. The capacitor C3 of the slope generation unit 52 is connected to the transistor Q3. When the second sync signal Ve is at the lower potential, the potential between the capacitor C3 and the transistor Q3 drops instantaneously, and the capacitor C3 starts discharging, and the size of the slope regulation signal Vi can change the discharging speed of the capacitor C3. When the potential between the capacitor C3 and the transistor Q3 rises to a trigger voltage value to set ON the transistor Q3, the another transistor Q5 also is set ON due to the potential alteration of the transistor Q3. At the instant when the transistor Q3 is ON the capacitor C2 discharges a great current to pass through the another transistor Q5 to fully set ON the transistor Q3. And the action speed of the latchup unit 53 also accelerates to avoid transfer delay. While the transistor Q3 is ON the bias power source Vcc is grounded through voltage division of the resistors R7 and R9 to set the auxiliary flywheel switch 42 OFF. The voltage transformation unit 54 includes a bias power source Vcc, six transistors R1-R6, a capacitor C1 and two transistors Q1 and Q2. The transistor Q2 has an emitter connecting to a collector of the transistor Q3 of the latchup unit 53. Hence when the transistor Q3 is ON, the potential of the emitter of the transistor Q2 and the collector of the transistor Q3 drops. The base of the transistor Q2 is driven by the voltage division resulting from the bias power source Vcc and the resistors R4 and R5 to set the transistor Q2 ON. When the transistor Q2 is ON the voltage of the base of the transistor Q1 drops to turn off the transistor Q1. As a result output of the chopping signal Vd stops. On the other hand, when the transistor Q3 is OFF, the transistor Q2 also is driven OFF, and the transistor Q1 is ON, in cooperation with the bias power source Vcc and voltage division of the transistors R1, R2, R3 and R6, a steady current is output to form the chop-wave signal Vd. As the chop-wave signal Vd is formed by current, delay caused by capacitance effect on the voltage control switches such as MOSFET can be prevented. All the units previously discussed employ the slope generation unit 52 to generate the trigger signal Vk with a triangular wave. By comparing with the feedback amount through the feedback unit 51 the slope of the triangular wave can be altered to adjust the trigger time of the latchup unit 53. The latchup unit 53 latches a duty condition through a latchup circuit to set the auxiliary flywheel switch 42ON or OFF, and drive the voltage transformation unit 54 to operate and generate and output the time sequence of the chop-wave signal Vd. As a result the auxiliary output switch 41 and the auxiliary flywheel switch 42 can be set ON alternately. Moreover, the chop-wave switch 43 can stop or start the power of the auxiliary output unit 4 during the ON period of the auxiliary output unit 41 according to the intensity of the feedback signal. Thereby auxiliary output power can be regulated, and transfer delay and cycle fluctuation phenomena can be improved.

Figure 3:
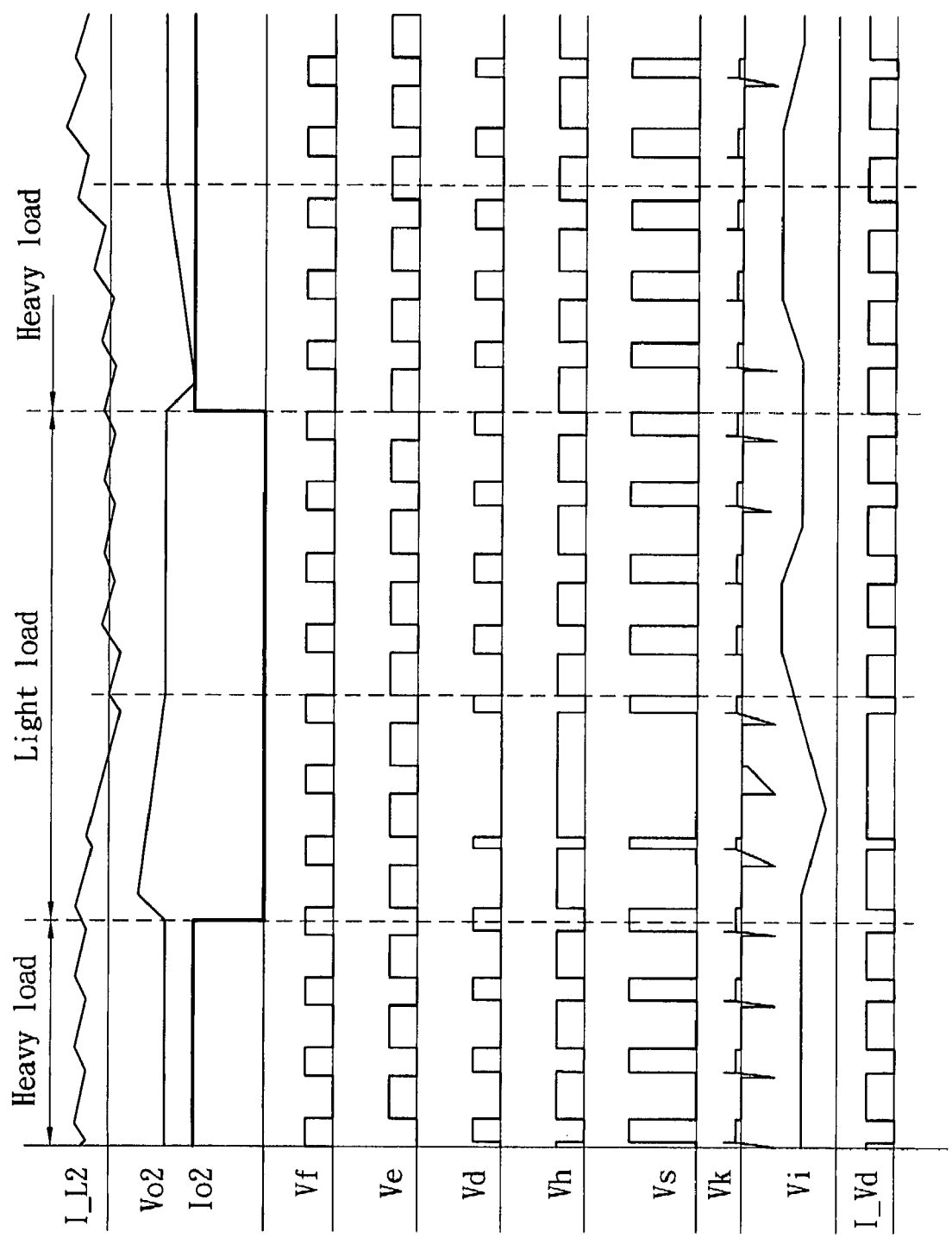
FIG. 3 is a waveform chart according to the circuit diagram of an embodiment of the invention.

Also referring to FIGS. 1 and 3, with FIG. 3 showing voltage waveforms at various nodes in FIG. 1, the first sync signal Vf and the flywheel switch driving signal Vh are staggered. The feedback unit 51 captures a feedback to generate the slope regulation signal Vi. The slope regulation signal Vi alters the slope of the triangular wave of the trigger signal Vk to adjust the trigger time of the latch unit 53, and output the flywheel switch driving signal Vh so that the first sync signal Vf and the flywheel switch driving signal Vh are staggered. As a result the auxiliary output switch 41 and the auxiliary flywheel switch 42 are set ON alternately. Moreover, the potential variation of the latchup unit 53 is transformed to current through the voltage transformation unit 54 to generate the chop-wave signal Vd, thereby to control conduction timing of the chop switch 43. According to the size of the load the output time sequence of the chop-wave signal Vd is adjusted. When the load is heavy the feedback amount is lower, the feedback unit 51 outputs a greater slope regulation signal V1 to set on the chop-wave switch 43 faster, thereby the auxiliary output period is longer. In the condition of a lighter load, the condition is opposite. The slope regulation signal Vi sets ON the chop-wave switch 43 slower or stops for one cycle to reduce output of the auxiliary output unit 4. And output is adjusted according to the feedback amount.

Figure 4:
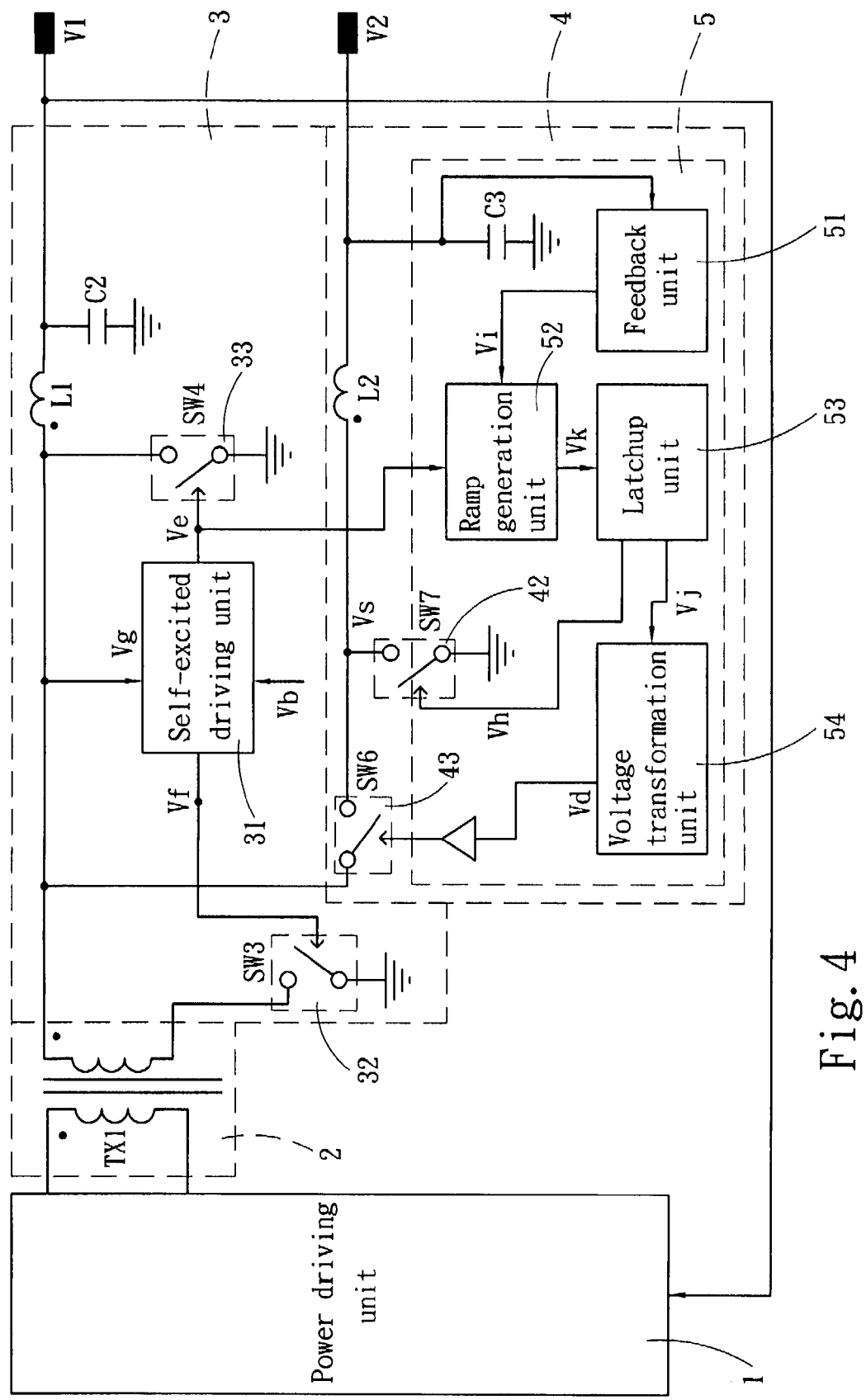
FIG. 4 is a block diagram of another embodiment of the invention.

Refer to FIG. 4 for the circuit diagram of another embodiment of the invention. The main output unit 3 branches out an auxiliary output unit 4 that share a main output switch 32. However the auxiliary output unit 4 has a chop-wave switch 43 to regulate output power of the auxiliary output unit 4 through the chop-wave control circuit 5. The embodiments set forth above serve only for illustrative purpose. The invention can be adapted to other circuits using the chop circuit to control chop time sequence.

In short, the invention uses the latchup unit 53 to achieve the functions of comparing the feedback amount and ON/OFF triggering of the auxiliary flywheel switch 42. The latchup unit 53 perform trigger function through transistors. Thus the delay occurred to the comparator in the conventional techniques can be greatly improved. The active duty cycle of the auxiliary output unit 4 can be enhanced, and transient response also improves.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A chop-wave control circuit to be used on a forward transformation circuit which includes a power driving unit, a transformer, a main output unit and at least one auxiliary output unit; the power driving unit sending power through the transformer to the main output unit and the auxiliary output unit, the main output unit generating a first sync signal and a second sync signal through a self-excited driving unit to control respectively a main output switch and a main flywheel switch that are set on alternately to perform output, the auxiliary output unit including an auxiliary output switch synchronous with the main output switch and an auxiliary flywheel switch and a chop-wave switch that are controlled by the chop-wave control circuit, the chop-wave control circuit comprising:

a feedback unit which captures a feedback signal from the auxiliary output unit to generate a slope regulation signal;

a ramp generation unit which receives the second sync signal to generate an output cycle range for the ramp generation unit and output a trigger signal which has a triangular wave and alter the slope of the triangular wave according to the slope regulation signal, and perform regulation according to the alteration of the slope of the triangular wave;

a latchup unit which receives the trigger signal to alter latchup conditions and set the auxiliary flywheel switch ON or OFF; and a voltage transformation unit which detects potential variations of the latchup unit and determines the latchup conditions of the latchup unit to output or stop a chop-wave signal to set the chop-wave switch ON or OFF;

wherein the slope regulation signal alters the slope of the triangular wave of the trigger signal to change trigger time of the latchup unit thereby to alter conduction timing of the auxiliary flywheel switch and the chop-wave switch to match actions of the auxiliary output switch to form a power output cycle of the auxiliary output unit.

2. The chop-wave control circuit of claim 1, wherein the feedback unit includes a comparator and a reference voltage, the feedback signal and the reference voltage being fed in the comparator which compares the difference between the feedback signal and the reference voltage to output the slope regulation signal.

3. The chop-wave control circuit of claim 1, wherein the ramp generation unit includes a charge circuit and a switch element whose ON/OFF being controlled by the second sync signal, charging and discharging of the charge circuit being controlled by ON/OFF of the switch element.

4. The chop-wave control circuit of claim 3, wherein the charge circuit discharges at a speed controlled by the intensity of the slope regulation signal to alter the slope of the triangular wave of the trigger signal.

5. The chop-wave control circuit of claim 1, wherein the latchup unit includes a latchup circuit and a charge circuit, the latchup circuit having a duty condition divided into an ON condition and an OFF condition, the latchup circuit having a trigger voltage value, the latchup circuit being set ON when the trigger signal reaches the trigger voltage value; the latchup circuit being set OFF when the trigger signal is lower than the trigger voltage value; charging and discharging of the charge circuit being controlled by the latchup circuit, the latchup circuit altering the duty condition through the trigger signal.

6. The chop-wave control circuit of claim 5, wherein the charge circuit discharges to set on the latchup circuit rapidly when the trigger signal reaches the trigger voltage value, and the charge circuit charges while the latchup circuit is in the OFF condition.

7. The chop-wave control circuit of claim 5, wherein the latchup circuit includes two transistors.

8. The chop-wave control circuit of claim 1, wherein the voltage transformation unit is connected to the latchup unit and determines ON or OFF condition of the latchup unit according to the potential variations of the latchup unit, and outputs a chop-wave signal to the chop-wave circuit when the latchup unit is in the OFF condition.

9. The chop-wave control circuit of claim 8, wherein the voltage transformation unit includes two transistors and a power source, the two transistors being ON alternately, the ON/OFF condition of one transistor being controlled by the potential of the latchup unit, the power source being in cooperation with the ON condition of another transistor to output the chopping signal thereby to transform the potential of the latchup unit to current to be output.

* * * * *

UNITED STATES PATENT AND TRADEMARK OFFICE
CERTIFICATE OF CORRECTION

| | |
|---|---|
| PATENT NO. | : 7,391,626 B1 |
| APPLICATION NO. | : 11/808411 |
| DATED | : June 24, 2008 |
| INVENTOR(S) | : Kuo-Fan Lin |

It is certified that error appears in the above-identified patent and that said Letters Patent is hereby corrected as shown below:

On the Title Page Item (73) Assignee, please add a second Assignee as follows:

--Kuo-Fan LIN, Taoyuan (TW)--

Signed and Sealed this

Third Day of February, 2009

JOHN DOLL
*Acting Director of the United States Patent and Trademark Office*